(12) United States Patent
Van Den Brink

(10) Patent No.: US 8,249,775 B2
(45) Date of Patent: Aug. 21, 2012

(54) SELF-BALANCING VEHICLE

(75) Inventor: Christopher Ralph Van Den Brink, Puttershoek (NL)

(73) Assignee: Brinks Westmaas B.V., Dordrecht (NL)

( * ) Notice: Subject to any disclaimer, the term of this patent is extended or adjusted under 35 U.S.C. 154(b) by 1136 days.

(21) Appl. No.: 11/916,081

(22) PCT Filed: May 31, 2006

(86) PCT No.: PCT/NL2006/050129
§ 371 (c)(1),
(2), (4) Date: Feb. 12, 2008

(87) PCT Pub. No.: WO2006/130007
PCT Pub. Date: Dec. 7, 2006

(65) Prior Publication Data
US 2009/0312908 A1    Dec. 17, 2009

(30) Foreign Application Priority Data
May 31, 2005   (NL) ...................................... 1029153

(51) Int. Cl.
*B60G 21/00* (2006.01)
*B62D 61/08* (2006.01)

(52) U.S. Cl. ...... 701/38; 701/41; 280/5.507; 280/5.509; 180/210

(58) Field of Classification Search ............ 701/36–39, 701/41; 280/5, 5.502, 5.504, 5.506–5.509, 280/5.51, 5.513, 5.514, 6.15, 6.16, 91.1, 280/124.1, 124.103; 180/210, 211, 215, 180/233
See application file for complete search history.

(56) References Cited

U.S. PATENT DOCUMENTS

| 4,484,648 | A | * | 11/1984 | Jephcott ........................ 180/210 |
| 4,660,853 | A | | 4/1987 | Jephcott |
| 4,987,542 | A | * | 1/1991 | Tran ................................ 701/1 |
| 5,116,069 | A | | 5/1992 | Miller |
| 5,483,452 | A | * | 1/1996 | Tanaka ............................ 701/70 |
| 6,435,522 | B1 | * | 8/2002 | Van Den Brink et al. . 280/5.509 |

(Continued)

FOREIGN PATENT DOCUMENTS

DE    197 38 826  A1    3/1999

(Continued)

OTHER PUBLICATIONS

International Search Report of PCT/NL050129 filed May 31, 2006, date of mailing Feb. 12, 2007.

*Primary Examiner* — Thomas G. Black
*Assistant Examiner* — Ce Li
(74) *Attorney, Agent, or Firm* — Young & Thompson

(57) ABSTRACT

A vehicle includes:
  at least three wheels, of which at least two wheels are situated on either side of the center of gravity of the vehicle's longitudinal axis and wherein at least one of the wheels has a steering effect on the direction of the vehicle,
  a frame having a tilting frame section, rotatable in the longitudinal axis relative to the road surface,
  a steering element mounted so as to rotate relative to the tilting frame section,
  one or more tilting elements connected to the tilting frame section and the wheels for exerting a tilting movement between the tilting frame section and the road surface,
  a speed sensor,
  a steering sensor for determining the force/torque or size of the steering wheel movement for achieving a change in the direction of the steerable wheel or wheels.

20 Claims, 6 Drawing Sheets

U.S. PATENT DOCUMENTS

| | | | |
|---|---|---|---|
| 2003/0160428 A1* | 8/2003 | Lindell et al. | 280/432 |
| 2004/0100059 A1* | 5/2004 | Van Den Brink et al. | 280/124.103 |
| 2006/0097471 A1* | 5/2006 | Van Den Brink et al. | 280/124.103 |
| 2007/0193803 A1* | 8/2007 | Geiser | 180/215 |
| 2007/0276566 A1* | 11/2007 | Diebold et al. | 701/45 |

FOREIGN PATENT DOCUMENTS

| | | |
|---|---|---|
| EP | 1516806 B1 * | 3/2005 |
| FR | 2 646379 A1 | 11/1990 |
| JP | 8127219 A * | 5/1996 |
| JP | 2001-515821 A * | 9/2001 |
| WO | 95/34459 A1 | 12/1995 |
| WO | 99/14099 A | 3/1999 |

* cited by examiner

SELF-BALANCING VEHICLE

BACKGROUND OF THE INVENTION

1. Field of the Invention

The invention relates to a self-balancing vehicle equipped with:

at least three wheels, of which at least two wheels are situated on either side of the centre of gravity of the vehicle's longitudinal axis and wherein at least one of the wheels has a steering effect on the direction of the vehicle, a frame consisting of a tilting frame section, wherein said frame section can rotate in the longitudinal axis relative to the road surface, a steering means which is mounted so that it can rotate relative to the tilting frame section, and one or more tilting elements which form a connection between the tilting frame section and the wheels in such a way that said tilting element can exert a tilting moment and/or tilting movement between the tilting frame section and the road surface. What can be achieved by this is that the vehicle is in a completely or partially balanced state during use.

2. Description of the Related Art

A known vehicle of the type referred to above is described in WO 95/34459 in the name of the applicant. This vehicle is a self-stabilising vehicle with at least three wheels, wherein a sensor connected to the direction-determining wheel generates a control signal to control one or more tilting elements. With this arrangement the force or moment acting on the front wheel is measured with the aid of a sensor and the driver's section is tilted by means of hydraulic cylinders in such a way that the force or moment exerted on the front wheel becomes practically 0. This results in a stable and comfortable driving behaviour and the driver's section remains balanced in bends or when driving on laterally sloping surfaces. This vehicle operates particularly well at speeds above 10 km/h and will exhibit an undesirable tilting behaviour at very low speeds, when stationary, during parking manoeuvres and reversing.

Another known vehicle of the type referred to above is described in WO 99/24308 in the name of the applicant. This vehicle is a self-stabilising vehicle with at least three wheels, wherein an opposite lock power transmitter is connected to a steerable front wheel. As a result, the vehicle operates even better at high speeds. However, this invention does not provide any solution for balancing at low speeds, when stationary, or during reversing.

Another known vehicle of the type referred to above is described in WO 99/14099 in the name of the applicant. This vehicle is a self-stabilising vehicle with at least three wheels, wherein a sensor determines the turning angle between the front wheel and the steering column and controls one or more tilting elements of the vehicle, depending on the turning angle. This vehicle is also equipped with a system that puts the vehicle in a perpendicular position relative to the road surface at low speeds and when stationary. However, this solution at low speeds does not work as required on a laterally sloping surface. The vehicle is then out of balance and on changes in speed will vary between a balanced state at high speeds and a perpendicular state at low speeds or when reversing.

Another known vehicle analogous to the type referred to above is described in EP0 941 198.

This vehicle is a self-stabilising vehicle with three wheels, a tilting vehicle section and a non-tilting vehicle section and employs a sensor that measures the vehicle speed, a sensor that determines the lateral acceleration and a sensor that determines the tilt angle of the non-tilting vehicle section relative to the centre of gravity. Below a certain speed, typically 3 km/h, these last two sensors generate the required control signals for the microprocessor control system which then controls the one or more tilting elements via a hydraulic circuit. Above this transitional speed, the hydraulic circuit is left open, as a result of which no forces are exerted from the one of more tilting elements. As a result of this, the vehicle assumes a driving and steering behaviour at higher speeds analogous to that of a motorcycle consisting of two wheels. Consequently this vehicle is difficult to steer because the transition from low speed to high speed is difficult for the driver to learn. In addition, the system offers no solution for coping with a large imbalance at high speed. It is also not suitable for vehicles with four wheels.

Vehicles that are equipped with a lateral acceleration sensor have the major disadvantage that they have a late reaction speed to changes in direction. Moreover, such lateral acceleration sensors react sharply to transient lateral accelerations that are typical at high speeds. These sensors also react sharply to lateral accelerations that are caused by the tilting movements of the vehicle. As a result of this, tilting systems equipped only with a lateral acceleration sensor exhibit a nervous and oscillating behaviour, particularly at high speeds. For this reason, various extremely complicated measurement and control systems are often used to attenuate this oscillating behaviour. This often leads to even later reaction speeds, as a result of which the stability of the vehicle is at risk.

Vehicles equipped with a steering sensor do not exhibit these disadvantages, but do not operate totally satisfactorily at low speed and particularly when stationary. Force moments on the steering wheel, which are often the case at low speeds (under 10 km/h), often result in a tilting that does not contribute to the desired balance situation. As a result of this, tilting systems equipped with only a steering sensor exhibit exaggerated and undesirable tilting movements which are experienced by the driver as undesirable. For this reason, a system is described in WO 99/14099 in the name of the applicant wherein below a given speed the tilting behaviour is switched off and the vehicle is positioned upright. The relatively small disadvantage of this system is the fact that a transition then takes place between a balanced state and an unbalanced state. Particularly on sloping road surfaces, this is experienced as undesirable.

SUMMARY OF THE INVENTION

The aim of the invention is to provide a steering system with which the vehicle, or a part of the vehicle, can be kept in balance under all conditions, so that a high degree of stability, safety and comfort can be guaranteed. The aim of the invention is in particular to provide a solution for optimum functioning at low speeds and when stationary without negatively influencing good functioning at high speeds. The aim of the invention is also to reduce the sensitivity of the vehicle to side winds, particularly at high speeds. It is also the aim of the invention to provide not only a solution for vehicles with three wheels but also a complete solution for vehicles with four or more wheels.

In order to achieve this aim, according to the present invention a measurement is performed of the speed of the vehicle (speed sensor), the force/the torque or the size of the steering wheel movement for achieving a change in the direction of the steerable wheel or the steerable wheels (the steering sensor), and a measurement is also performed of a lateral acceleration of the tilting frame section of the vehicle (the lateral acceleration sensor). These three measurements are then used for determining the size and direction of the tilting for the tiltable vehicle section.

Through this combination it is possible to achieve the correct balancing properties at both low speeds and high speeds. Various part solutions are possible to determine the extent to which these two sensors contribute to the control of the tilting cylinders. For instance, a mechanical, hydraulic, electrical or electronic method of operation is conceivable, or a combination thereof. A combination of an electrical or electronic measurement and control technology based on electrical or electronic sensors, wherein one or more tilting elements are controlled hydraulically/mechanically, is preferred in this respect. Particularly suitable in this respect are integrated microelectronic circuits on which measurement and control algorithms can be programmed with the aid of appropriate software. With these it is possible to achieve rapid optimisation of the measurement and control parameters. In addition, with these it is possible to configure the tilting behaviour of the vehicle in the form of preprogrammed settings and to call these up as required. This enables the driver to call up the optimum tilting characteristics, depending on the driving conditions.

Various methods are also possible for combining the signal from the steering sensor and the signal from the lateral acceleration sensor to form a control system for the one or more tilting elements. Signals from other sensors can also be used in these methods in order to determine or improve the extent to which the above-mentioned signals are used. Sensors considered to be particularly suitable for this are:

a tilt angle sensor that determines the angle between the tilting vehicle section and the underside of the wheels, a reversing switch that establishes the direction of travel of the vehicle, two lateral air pressure sensors that determine the air pressure on the two lateral sides of the vehicle and/or the difference in air pressure between the two lateral sides of the vehicle, an angle sensor that measures the turn of the steering shaft relative to the tilting frame section, a hydraulic pressure sensor, which establishes the hydraulic pressure in the tilting system, a second lateral acceleration sensor, which measures the lateral acceleration of the non-tilting frame section.

One possible method that results in the proper functioning of the tilting behaviour makes great use of the speed signal from the speed sensor. This signal is used to set the degree of influence of the steering sensor and the lateral acceleration sensor. In this respect the method is configured in such a way that at low forward speeds, when stationary and/or at reverse speeds the lateral acceleration is predominantly used for control, while at high forward speeds the steering sensor is predominantly used for controlling the tilting behaviour. As a result of this, at low speeds the tilting behaviour will be relatively insensitive to large steering wheel movements or steering moments on the steering wheel. On the other hand, with this method a high speed of reaction will be possible at high speeds and the vehicle will be relatively insensitive to transient lateral impulses.

Various methods are possible for the transition between low and high speeds. In this respect a control system is conceivable in which the extent to which the steering sensor influences the tilting behaviour increases and/or the extent to which the acceleration sensor influences, decreases proportionally with increasing speed. This increase and/or decrease in the influence of respective sensors does not necessarily have to be linear, but may be a flowing function. Experts in the field will be familiar with the hydraulic, mechanical, electrical and/or electronic measurement and control technologies in order to effect this.

In a typical method the signal from the steering sensor and the signal from the lateral acceleration sensor are combined after preprocessing to produce one measurement signal for the measurement and control loop that governs the output control signals to the one or more tilting elements. With this control, the one or more tilting elements are usually controlled in such a way that this measurement signal becomes zero or practically zero. During the preprocessing referred to the signal values from these sensors are adapted as a function of the speed. This entire processing can be described with this equation:

$$MS = SKS * f(V) + LVS * g(V)$$

In this equation MS corresponds to the measurement signal that serves as input signal for the measurement and control loop, SKS to the steering sensor signal and LVS to the lateral acceleration signal. f(V) and g(V) are speed-dependent functions that determine the degree of influence of the respective sensors on the complete measurement signal. A schematic elaboration of this is shown in FIG. 5.

Experts in the field will be aware that in the extreme case where f(V) is 1 and g(V) is zero, the above equation will correspond to the control system which is described in WO 95/34459 in the name of the applicant. In this case the steering sensor serves as the measurement signal.

In an alternative embodiment, a tilt angle sensor is also used in addition to the three sensors mentioned above. This tilt angle sensor is fixed to the various frame parts in such a way that it produces a signal so that it is possible to register and transmit the angle between the tilting frame part and the road surface. This tilt angle sensor can serve for a large number of functions. Firstly, it offers the possibility of positioning the vehicle upright (at right angles with respect to the road surface) in certain situations. This can be desirable when reversing, during parking or in an emergency situation. Secondly, a tilt angle sensor offers the possibility of attenuating oscillations or nervous behaviour in the control system. Particularly where the tilting cylinders are controlled with the aid of a pressure or force-related output signal, a feedback of the angle between the tilting frame section and the road surface is desirable. In this respect, various methods are possible where the signal from the lateral acceleration sensor, the tilt angle sensor and the steering force can be used.

In a desired method the signal from the steering sensor, the signal from the lateral acceleration sensor and the signal from the tilt angle sensor are combined after preprocessing into a single measurement signal for the measurement and control loop. During the preprocessing, the signal values from these sensors are adapted as a function of the speed. This entire processing can be described with this equation:

$$MS = SKS * f(V) + LVS * g(V) + HS * h(V)$$

In this equation MS corresponds to the measurement signal that serves as input signal for the measurement and control loop, SKS to the steering sensor signal, LVS to the lateral acceleration signal and HS to the angle signal. f(V), g(V) and h(V) are speed-dependent functions that determine the degree of influence of the respective sensors on the complete measurement signal. These functions have a preferably continuous character so that transitions between different speeds take place gradually. A schematic elaboration of this is shown in FIG. 6.

For experts in the field it is obvious to refine the vehicle behaviour by modifying the above equation by, for example, making the speed-dependent functions f, g, h dependent on more parameters than just the speed. An obvious step in this respect is, for example, to make the speed-dependent function f(V) and g(V) additionally a function of the signal from the tilt angle sensor. As a result of this, the tilt angle signal can be used to either decrease or increase the extent to which the respective signals from the steering force sensor and lateral acceleration sensor influence the tilting control system. The functions are then written as f(V, HS) and g(V, HS). It is also obvious to make the speed-dependent function h(V) additionally a function of the signal from the lateral acceleration sensor. As a result of this, the signal from the lateral acceleration sensor can be used to either decrease or increase the extent to which the signal from the tilt angle sensor influences the tilting control system. The function is then h(V, LVS).

Another method in which the tilt angle sensor is used is one where the tilt angle sensor forms a "slave" measurement and control loop together with the pressure or force-related output signal and the tilting cylinders coupled thereto. This measurement and control loop is able to control an absolute angle and uses an angle setting value that is generated by the "master" measurement and control loop as the set point. This "master" measurement and control loop uses the three sensors to generate an output control value that dictates the tilt angle.

In yet another method the tilt angle sensor is combined with the lateral acceleration sensor. In this case these signals are combined into a "virtual inclination" parameter that can be suitably used as a target/convergence value for the control of the tilting. This can be written in the form of an equation as:

$$MS = SKS * f(V) + VH * i(V)$$

$$VH = j(LVS, HS)$$

In this equation VH corresponds to the virtual inclination parameter which is a function of the signal from the lateral acceleration sensor and the signal from the tilt angle sensor. i(V) is a speed-dependent function related to the extent to which the virtual inclination parameter influences the complete measurement signal. j(LVS, HS) is a function that combines the signal from the lateral acceleration sensor and the signal from the angle sensor such that it results in a virtual angle.

In an alternative embodiment, the two lateral air pressure sensors are used to suppress the influence of side wind. For this purpose, the differences in air pressure on either side of the vehicle are determined analogously to the abovementioned control. This can be achieved by subtracting the signal from the two individual sensors electrically or electronically so that this results in an air pressure difference signal. This air pressure difference signal is then used to register the degree of side wind and to make a correction to the control and/or to apply pressure to the tilting elements, such that the vehicle remains upright.

The air pressure difference signal can be used to correct the natural tendency of the vehicle to tilt into the wind by using the air pressure difference signal analogously to the other signals as extra signal in the tilt control system. In this case the equation that describes MS will have an additional term which is dependent on the air pressure difference signal. The air pressure difference signal can also modify the control of the power steering (if installed in the vehicle) on the front wheel(s), as a result of which the vehicle indirectly takes on a different equilibrium position.

The measurement and control systems can be mechanical, hydraulic, electric or electronic or a combination of these. In this sense the abovementioned functions f, g, h, i and j can be regarded as an abstract description of the sensitivities that the various sensors and controls introduce into the system. Without wishing to preclude any other possibilities, in the case of a hydraulic system these types of function can be achieved with, for example, a proportional valve and in the case of a mechanical system such functions can be achieved with, for example, rods, levers, gears, etc.

However, use is preferably made of a system that contains an electric or electronic drive. Particularly where electronic systems based on microelectronics which can be programmed are used, these functions can be programmed as computation algorithms. Without wishing to preclude other possibilities, in this case such a function can consist of an equation, or a look-up table (grid).

The steering sensor can consist of a torsion element which is coupled to a hydraulic proportional valve as described in patent NL 1000161. The steering sensor can also consist of strain sensors that are fixed on the handlebar shaft in such a way that they produce a signal that is proportional to the force exerted on the handlebar shaft. Other possibilities for measuring steering force are known to experts in the field.

The lateral acceleration sensor can consist of mechanical systems such as pendulums to which a tilt angle sensor may be coupled that converts the position of the pendulum into an electric signal. Electronic g sensors based on semi-conductor technology are also suitable. A liquid column which is oriented across the vehicle in combination with pressure sensors can also fulfil this function. Other possibilities for measuring lateral accelerations are known to experts in the field.

In some cases it is desirable to attenuate the signal from the lateral acceleration sensor before it is transmitted to the control system. This results in smoother driving behaviour. At low speeds the inertia of the sensor signal caused by attenuation is not a major problem. The extent of attenuation can also be a function of the speed. Attenuation can be effected by mechanical techniques and/or electronic techniques.

It is important to position the lateral acceleration sensor close to the virtual tilting axis of the tilting frame section. As a result of this, the rotational movements of the tilting frame section will have a minimum influence on the signal from the lateral acceleration sensor. The lateral acceleration sensor is preferably located within a radius of 30 cm from the virtual tilting axis, more preferably within a radius of 20 cm and most preferably within a radius of 10 cm.

The tilt angle sensor comprises a sensor portion, such as a potentiometer or special electronic tilt angle sensor such as is known by the expert in the field and a coupling to the vehicle. This coupling of the tilt angle sensor must be chosen in such a way that it can determine, directly or indirectly, the goniometric angle between the tilting frame section and the road surface and/or the underside of the wheels. All parts in the vehicle that exhibit a movement relative to the road surface which is goniometrically proportional to that of the tilting frame are in principle suitable as the first mounting point for the tilt angle sensor. All parts in the wheel units that exhibit a movement relative to the tilting frame section which is goniometrically proportional to that of the underside of the wheels are in principle suitable as the second mounting point for the tilt angle sensor.

Without wishing to preclude other possibilities, obvious first connection points for the tilt angle sensor are: the tilting frame section itself, the vertical parts in the trapezium/parallelogram of the double wishbone in the wheel units.

Without wishing to preclude other possibilities, obvious second connection points for the tilt angle sensor are: the torsion element, the horizontal parts in the trapezium/parallelogram of the double wishbone in the wheel units, or the yoke to which the wheel suspension is coupled.

Because the tilt angle sensor effectively measures the extent to which the tilting elements set the goniometric angle of turn between the tilting frame section and the road surface and/or the underside of the wheels, it is obvious to select the tilt angle sensor mounting points for the tilt angle sensor close to the mounting points for the tilting elements.

The speed sensor is often coupled to one of the wheels or to one of the drive shafts to the wheels and generates a pulse signal that has a frequency proportional to the speed. This pulse signal can be transformed into a useful electrical or electronic control signal. Other possibilities for measuring speeds are known to experts in the field.

As an addition to the speed sensor, it is desirable to install a reversing switch. As most speed sensors based on pulse signals register only the absolute speed, a switch sensor that registers and transmits the direction of the vehicle is desirable. This reversing switch can be coupled to one of the wheels or to one of the drive shafts to the wheels. It can also be coupled to the lever with which the driver operates the direction of the vehicle. This is often the gear lever, or a knob installed for this purpose.

In a possible embodiment of the invention, an acceleration sensor is used that registers not only the acceleration in the lateral direction but also the acceleration in the longitudinal direction of the vehicle. With this it is possible to obtain an indication of the vehicle speed using a second signal. As a result of this it is possible to detect a fault in the primary speed measurement and initiate the appropriate action, for example by giving a warning to the driver and/or activation of a fault mode/special program. Conventional acceleration sensors are generally available in single or double-axis versions in the same housing, so that this extra functionality is easy to implement.

If the control of the tilting is implemented in software, it is easily possible to expand the program with signal analysis functionality. This functionality monitors the signals from the various sensors and checks them for functionality and consistency. With the aid of the tilt angle sensors, this makes it possible to detect a wide range of faults and malfunctions after which giving a warning to the driver and/or a safe state with reduced tilting functionality can be activated. This significantly increases the safety of the system.

The control of the tilting elements can be implemented in various ways. In a preferred embodiment, an output signal is generated in the measurement and control system, which output signal dictates the pressure in the hydraulic system via a pressure-controlled valve. Because of this, the output signal has a direct influence on the pressure in the tilting elements and by this means dictates the force with which the tilting elements initiate the tilting movement.

In another preferred embodiment, an output signal is generated in the measurement and control loop, which output signal dictates the status or angle of the hydraulic system. In this case, on the one hand, a second "slave" measurement and control loop can be used wherein the tilt angle of the system is controlled. In this respect the output signal of the first measurement and control system serves as the set point for the second measurement and control system. The presence of a tilt angle sensor is essential for this control. On the other hand, a servo system can be used wherein the output signal leads directly to the setting of the tilt angle.

The above invention can be used in various forms of vehicle construction, such as in three-wheel vehicles which are equipped with one steering wheel at the front and two wheels at the rear, as well as in three-wheel vehicles which are equipped with two steering wheels at the front and one wheel at the rear. The invention can also be used in four-wheel vehicles with two parallel steering front wheels and two parallel rear wheels. In this case it is possible to envisage narrow cars with a round steering wheel, but also vehicles with a motorcycle handlebar also known as quad or ATV (all-terrain vehicle). Particularly for the latter category, the tilting system described offers a variety of benefits. In view of the high centre of gravity of quad vehicles, non-tilting versions of these vehicles have a strong tendency to lose stability and tip over in bends or on sloping ground. This can lead to dangerous situations and limits the potential applications of conventional quad vehicles. By applying the invention described to this type of vehicles, this provides increased stability both in bends as well as on steep sloping ground. By this means the invention described increases the safety and comfort of the vehicle and with this also increases the range of potential applications.

In most forms of construction, the driver sits in or on a seat that is connected to the tilting frame section and steers the vehicle by means of the steering means that is also connected to the tilting frame section. Consequently, the driver tilts together with the tilting frame section relative to the road surface. Under normal circumstances, the driver is generally exposed to practically no lateral acceleration forces in this tilting frame section with this invention and therefore is in balance.

In the description of the different forms of vehicle construction, use is made of the term "wheel unit". This term is used to refer to the combination of the following parts:

two wheels which are parallel to one another and are positioned on either side of the centre of gravity of the vehicle's longitudinal axis, the one or more shafts which are coupled to the wheels, wheel suspension that couples the two wheels to the vehicle, the shock absorbers which are coupled to the wheels, a reference point which serves as the uppermost base for the shock absorbers.

The reference point generally consists of two arms which are mounted so that they can rotate relative to the tilting frame. The most obvious embodiment of these two arms is a single yoke which is mounted so that it can rotate relative to the tilting frame, the shock absorbers being fastened directly or indirectly to the ends of the yoke. Another embodiment of the abovementioned two arms is a system wherein two independently mounted arms are fastened to the tilting frame, the position and movement of the two arms being linked by means of a hydraulic or mechanical coupling.

A wheel unit of this type forms the unit which can be seen as the base against which the tilting elements exert their forces/moments. This wheel unit also serves as reference for the road surface because various elements in this wheel unit exhibit a goniometrically proportional position and/or movement relative to the road surface. In this respect a wheel unit of this type can be seen as the non-tilting part of the vehicle, despite the fact that there are elements in the vehicle that exhibit a tilting behaviour.

In a wheel unit of this type it is possible to have the two wheels tilt in concert with the tilting of the tilting frame, or not. The concomitant tilting of the wheels in the wheel unit can be achieved by coupling the wheel suspension of the wheel unit to the tilting frame section. This is possible in particular by using wheel suspensions that have a double fastening to the tilting frame. An obvious solution in this case is the use of a double wishbone (also called trapezium construction) wheel suspension or MacPherson wheel suspension. Experts in the field will know other wheel suspensions that have a similar effect. By this means it is possible to couple the wheels to the tilting frame section in such a way that these wheels exhibit a more or less tilting behaviour that exhibits a goniometrically coupled movement with the tilting frame section. The extent of tilting can be set by the right choice of the distances in, for example, the double wishbone. It is also possible to have the wheels in the wheel unit not tilting in concert. This is desirable if the engine and drive unit is located in the wheel unit.

In the case of a three-wheel vehicle provided with one steering wheel at the front, the steering front wheel tilts in concert with the tilting frame section. If the steering front wheel has a certain castor, the signal from the steering force sensor can be used directly for the control of the tilting of the vehicle. In this vehicle configuration, the two rear wheels serve as reference point to the road surface and in this respect belong to the rear wheel unit as defined above. In this vehicle configuration it is possible to install the engine either in the tilting frame section or as part of the rear wheel unit. With the right choice of rear wheel unit configuration it is also possible in this vehicle configuration to have the rear wheels tilt in concert with the tilting frame section, or not, as described above.

In the case of a three-wheel vehicle provided with two steering wheels at the front, the two steering wheels, which make up part of the front wheel unit, serve both a function as steering front wheel and also as reference point for the road surface. With this configuration, several configurations are conceivable for generating a useful control force signal for the control of the tilting. One configuration has already been described in NL 1000161, wherein the two front wheels do not tilt in concert with the vehicle. In this case the tilting frame section of the vehicle is guided in one direction essentially perpendicular to the longitudinal direction of the vehicle relative to a preferably straight guide path, the position of which can be adjusted about an axis essentially parallel to the longitudinal axis of the vehicle.

In another embodiment, a choice is made for making the two steering wheels tilt to a large extent in concert with the tilting of the first frame, as described above. This results in a more natural castor force behaviour in the steering shaft. The steering force signal can now consequently be used for the control of the tilting. In order to improve this signal, the steering force signal must generally be processed such as with the functions f(V, HS) described above.

Making the two steering wheels in a wheel unit tilt to a considerable extent in concert with the tilting of the tilting frame section is described above.

In the case of four-wheel vehicles all the wheels can be mounted on one non-tilting frame section. With this arrangement the non-tilting frame section forms one physical unit to which the four wheels are connected with independent or non-independent spring suspension constructions.

In the case of four-wheel vehicles it is also possible to choose to couple the front wheels and rear wheels to the tilting frame as separate wheel units. With this arrangement it is possible in an extreme form to choose to couple the unit with the directional front wheels (front wheel unit) to the tilting frame section completely independently of the unit with the two rear wheels (rear wheel unit). In addition, the front wheel unit has a direct tilting connection to the tilting frame section and the rear wheel unit has a different, but also direct tilting connection to the tilting frame section. In this case the wheel units will exhibit an independent tilting behaviour. In this case it is possible to choose a configuration where only one of the two wheel units is coupled to one or more tilting elements.

It is also possible to choose a configuration where both wheel units are provided with tilting elements which exhibit independent behaviour.

In a less extreme form, the two wheel units are coupled in such a way that the front wheel unit and the rear wheel unit exhibit a synchronous turning angle behaviour relative to the tilting frame section. This can be achieved by ensuring that the necessary force or moment is exerted by the one or more tilting elements on both sub-sections at practically the same time. This coupling can be of a mechanical, hydraulic, electric or electronic nature. One possible embodiment for achieving this is to use more tilting elements, each wheel unit being operated separately by one or more tilting elements. The tilting elements then both receive a signal from the measurement and control system that may or may not be exactly synchronous. With this control it is possible to regulate the force and the point in time of application of this force on the front wheel unit independently of the rear wheel unit and thereby to achieve a slight asynchronous effect in respect of point in time and magnitude of the tilting movement.

In a mechanical preferred embodiment, the two wheel units are coupled by a coupling element in such a way that the force or moment exerted by the one or more tilting elements on one of the wheel units also results in a tilting force or tilting moment on the other wheel unit. In this way, no separate tilting element(s) has/have to be installed for each wheel unit and it is sufficient to provide power assistance for one of the wheel units. This makes the construction simpler and less expensive. The coupling element between the two wheel units can be implemented in many ways. The coupling element preferably consists of a torsion element which couples the front wheel unit to the rear wheel unit from front to rear and thus ensures that the two sub-sections change their angle to the tilting frame section to a proportional extent. In the function as described here, the torsion element can in fact be regarded as a reference point for the road surface. Tilting elements can therefore be connected directly to the torsion element. With the right choice of construction, the torsion element can be incorporated either high or low in the vehicle.

The torsion element can consist of any mechanical construction. Rods and beams are to be preferred in this respect. Through the use of a torsion element with some torsional elasticity it is possible to absorb any torsional forces which may result from unevenness in the road surface. It is also possible as a result of such elasticity to set the distribution of the tilting forces between front wheel unit and rear wheel unit as desired through suitable positioning of single tilting elements. If a rod or beam is used, this rod/beam should preferably be connected directly to the yokes of the wheel units. If the coupling element is positioned high in the vehicle, this connection can have a direct character. If the coupling element is positioned low, an intermediate rod can provide the link to the yoke positioned higher.

Without excluding other possibilities, the following coupling elements are also suitable for this function: chains, steel wires or hydraulic lines provided with pistons.

With the same transmission from the coupling element to the two sub-sections, this will usually result in an identical angle of turn of the two wheel units relative to the tilting frame section. In a preferred embodiment, however, the transmission from the coupling element to the different frame sections is chosen such that the front wheel unit exhibits a different tilt angle relative to the tilting frame section compared with the rear wheel unit. The consequence of this differing transmission is that in a bend, where tilting occurs, one of the four wheels is subjected to less pressure. This is a particular advantage if the vehicle does not have a differential. By reducing the pressure on one of the rear wheels, this wheel is able to slip more easily. Consequently, this slipping wheel is able to compensate for the difference in speed between the two rear wheels. This is a significant benefit for the cornering behaviour.

In all the abovementioned configurations for vehicles with four wheels, the tilting element or the tilting elements can constitute a link between the front wheel unit and the tilting frame section, as well as between the rear wheel unit and the tilting frame section. The tilt angle sensor can also constitute a link between the front wheel unit and the tilting frame section, as well as between the rear wheel unit and the tilting frame section.

In the abovementioned configurations for vehicles with four wheels, the engine can either be located in the tilting frame section, or in the front wheel unit or rear wheel unit. The engine is preferably located in the tilting frame section. Possibilities for enabling the drive torque of the engine in the tilting frame section to be transmitted to the wheels are described in patent NL 2004/1026658. The drive from the engine to the wheels can be effected on the front steering wheels as well as on the rear wheels. Driving of all four wheels is also possible.

In the abovementioned configurations for vehicles with four wheels, it is also possible to choose to make the two steering wheels tilt in concert with the tilting frame section to a considerable extent. This is also possible for the rear wheels. A possible configuration for making the wheels in a wheel unit tilt in concert with the tilting frame section is described above.

Without wishing to be exclusive in this respect, tilting elements such as those described in this invention can consist of mechanical, hydraulic, electromechanical and electrohydraulic systems. The control of the titling elements can be based on position, or on force and/or pressure, as desired. A non-exclusive example of position-controlled tilting elements are electromechanical servomotors which set the tilt between the tilting frame section and the road surface, wheels or wheel units. A non-exclusive example of pressure-controlled systems are hydraulic cylinders in combination with a mechanically or electromechanically controlled hydraulic control valve. In the latter case, a pressure measurement in the hydraulic system is desirable.

In all the abovementioned configurations for vehicles with three or more wheels, it is possible to combine these with the inventions WO 99/24308, WO 99/14099 and WO 0187689, all in the name of the Applicant.

BRIEF DESCRIPTION OF THE DRAWING FIGURES

Hereafter the invention is described in more detail on the basis of a non-restrictive illustrative embodiment with reference to the appended drawings.

In FIGS. 1b and 1c this vehicle is shown in a tilted state.

In FIGS. 2b and 2c this vehicle is shown in a tilted state.

In FIGS. 3b and 3c this vehicle is shown in a tilted state.

In FIGS. 4b and 4c this vehicle is shown in a tilted state.

DETAILED DESCRIPTION OF THE INVENTION

Figure 1A:
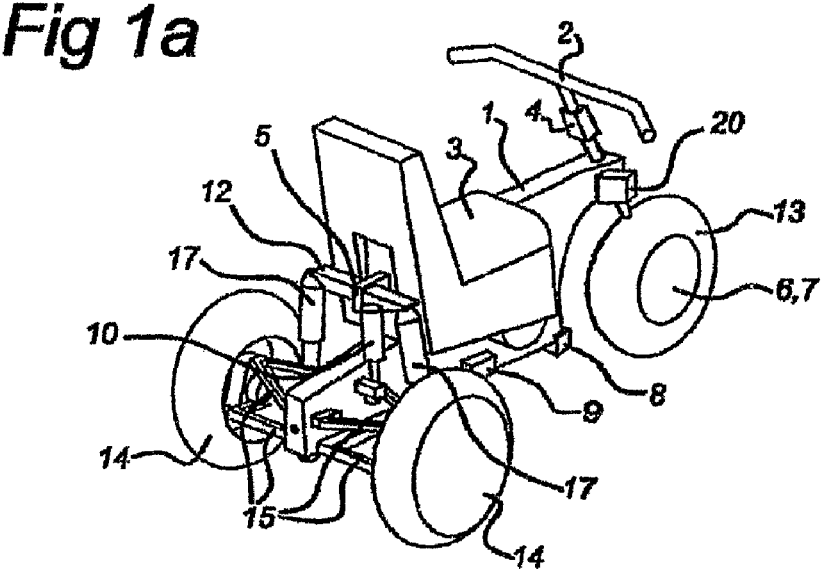
FIGS. 1a, 1b and 1c shows diagrammatically in a perspective side view a three-wheel vehicle with one steering front wheel and two rear wheels equipped with the sensor elements in accordance with the invention.
Figure 1B:
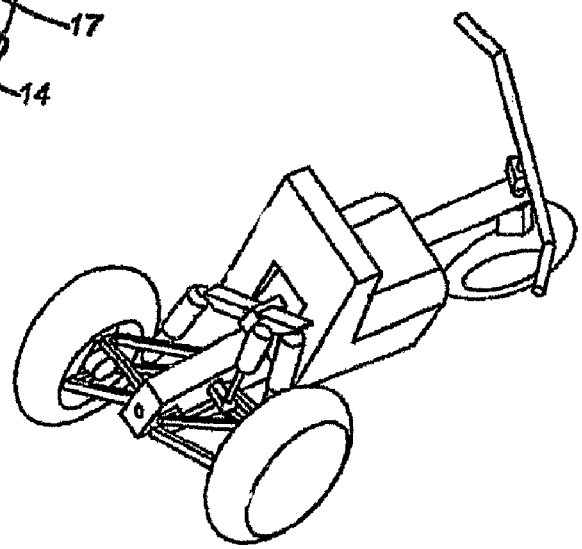
Figure 1C:
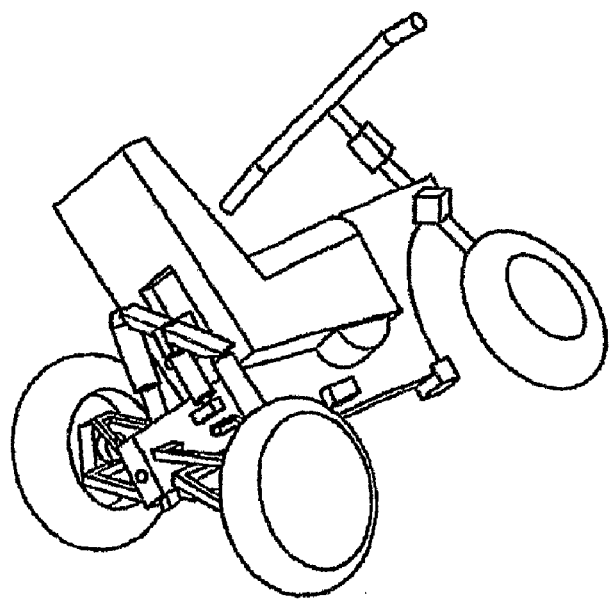

FIG. 1 shows a three-wheel vehicle with one steering front wheel and two rear wheels with a tilting frame section 1. The tilting frame section 1 has a handlebar 2, a seat 3. The tilting frame section 1 is fixed to the rear wheel unit, which consists of the rear wheels 14, the double wishbone 15, the shock absorbers 17 and the yoke 12, so that it can rotate. Steering sensor 4 is coupled to the steering shaft to the front wheel 13 in such a way that it registers the steering force. The tilt angle sensor 5 is connected in such a way that it registers the angle between the tilting frame section 1 and the yoke 12. In this example, reversing sensor 6 and speed sensor 7 are positioned in the front wheel. The lateral acceleration sensor 8 is positioned at the bottom of the tilting frame section. The signals from all the sensors are conducted via electric wires to measurement and control unit 9 in which signal processing and control of the hydraulic tilting cylinder 10 takes place. In this example, the pressure control of the hydraulic fluid, which leads to activation of hydraulic tilting cylinder 10, is integrated in measurement and control unit 9. The hydraulic tilting cylinder 10 connects yoke 12 and the tilting frame section 1 in such a way that activation of hydraulic tilting cylinder leads to a rotation of the yoke relative to the tilting frame section 1. This rotation results in a tilting of the tilting frame section 1 relative to the wheelbase. In this example, for example a turn of the handlebar to the right will have the consequence that steering sensor 4 produces a signal. At a high positive speed, this signal will make a contribution to the integrated measurement signal whereby this will deviate from the guide value. As a consequence of the tilting control which takes place in measurement and control unit 9, this will lead to hydraulic tilting cylinder 10 extending, which results in a tilting of tilting frame section 1 to the right. As a result of this, the force in steering sensor 4 will decrease and the drive to hydraulic tilting cylinder 10 will also decrease until equilibrium is reached. Depending on the measurement and control method employed, similar processes will also take place if the lateral acceleration sensor 8 and/or tilt angle sensor 5 produce a changing signal.

Figure 2A:
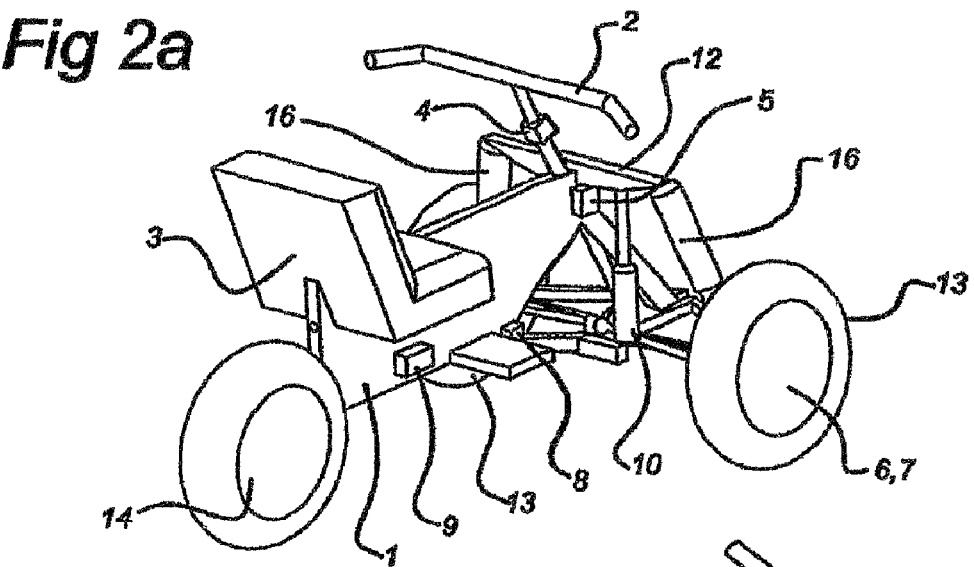
FIGS. 2a, 2b and 2c shows diagrammatically in a perspective side view a three-wheel vehicle equipped with two steering front wheels and one rear wheel with the sensor elements in accordance with the invention.
Figure 2B:
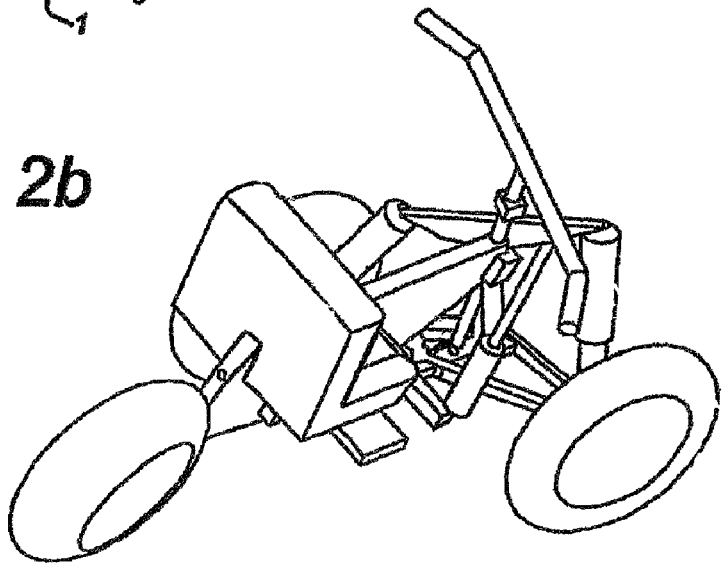
Figure 2C:
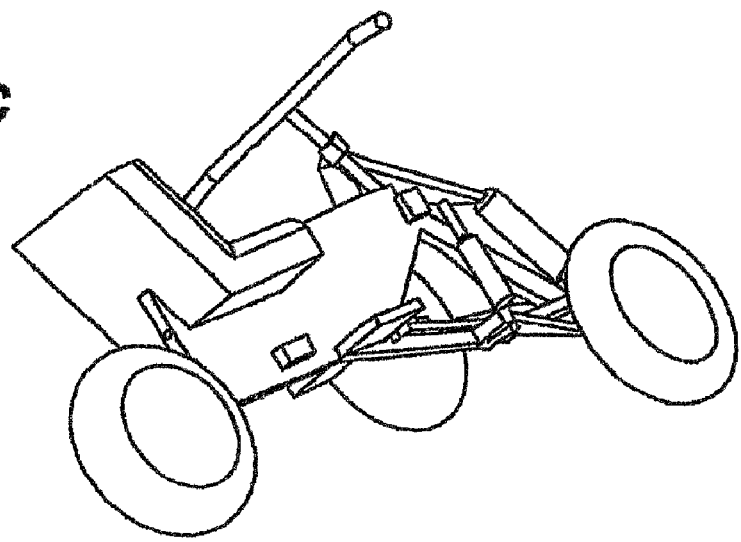

FIG. 2 shows a three-wheel vehicle equipped with two steering front wheels and one rear wheel with a tilting frame section 1. The tilting frame section 1 has a handlebar 2, a seat 3. The tilting frame section 1 is fixed to the front wheel unit, which consists of the front wheels 13, the MacPherson wheel suspension 16 in which the shock absorbers are integrated and the yoke 12, so that it can rotate.

Steering sensor 4 is coupled to the steering shaft to the front wheel unit in such a way that it registers the steering force. The tilt angle sensor 5 is connected in such a way that it registers the angle between the tilting frame section 1 and the yoke 12. In this example, reversing sensor 6 and speed sensor 7 are positioned in the right-hand front wheel. The lateral acceleration sensor 8 is positioned at the bottom of the tilting frame section 1. The signals from all the sensors are conducted via electric wires to measurement and control unit 9 in which signal processing and control of the hydraulic tilting cylinder 10 takes place. In this example, the pressure control of the hydraulic fluid, which leads to activation of hydraulic tilting cylinder 10, is integrated in measurement and control unit 9. The hydraulic tilting cylinder 10 connects yoke 12 and the tilting frame section 1 in such a way that activation of hydraulic tilting cylinder leads to a rotation of the yoke relative to the tilting frame section 1. This rotation results in a tilting of the tilting frame section 1 relative to the wheelbase. A turn of the handlebar to the right will result in a reaction similar to that portrayed in the description of FIG. 1.

Figure 3A:
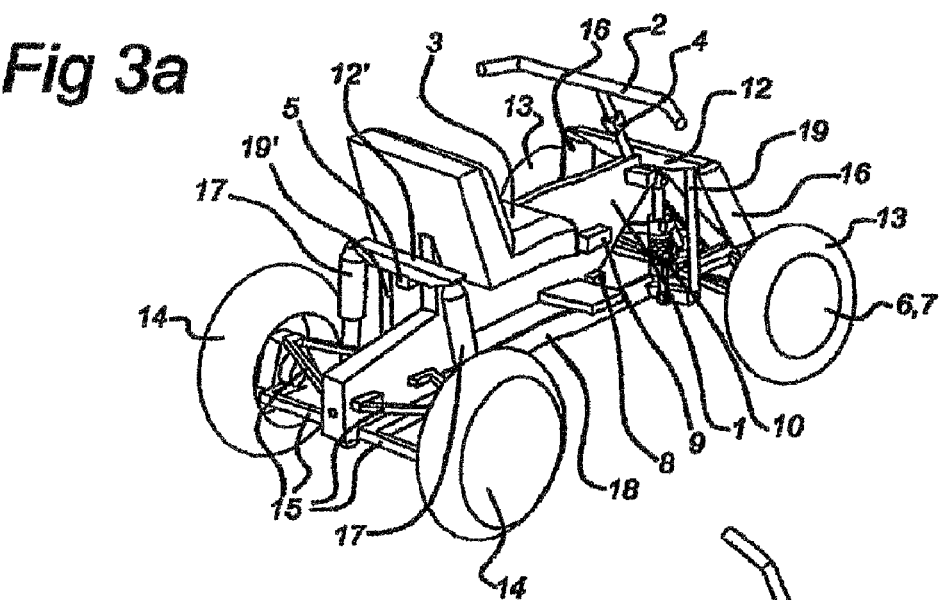
FIGS. 3a, 3b and 3c shows diagrammatically in a perspective side view a four-wheel vehicle equipped with two steering front wheels and two rear wheels with the sensor elements in accordance with the invention.
Figure 3B:
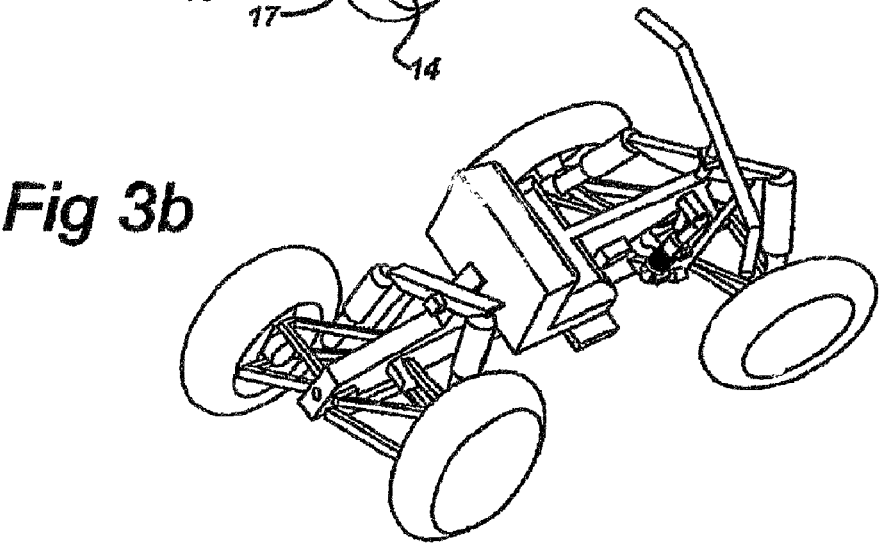
Figure 3C:
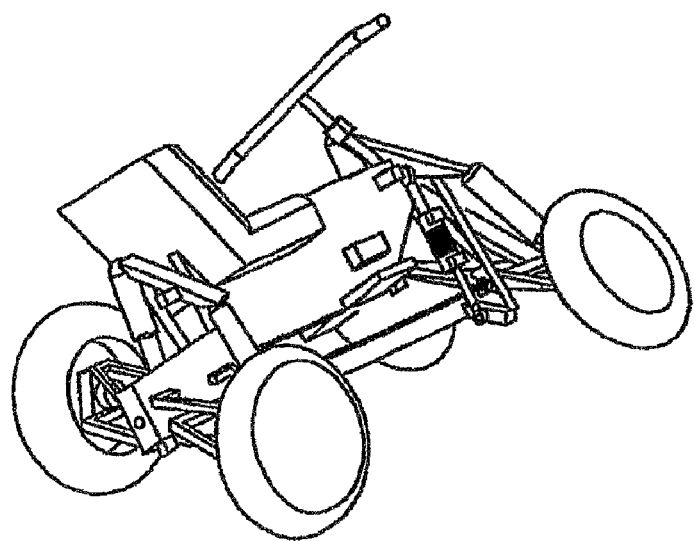

FIG. 3 shows a four-wheel vehicle equipped with two steering front wheels and two rear wheels with a tilting frame section 1. The tilting frame section 1 has a handlebar 2, a seat 3. The tilting frame section 1 is fixed to the front wheel unit, which consists of the front wheels 13, the MacPherson wheel suspension 16 in which the shock absorbers are integrated and the front yoke 12, so that it can rotate. The tilting frame section 1 is also fixed to the rear wheel unit, which consists of the rear wheels 14, the double wishbone 15, the shock absorbers 17 and the rear yoke 12', so that it can rotate. The front wheel unit and rear wheel unit are coupled by a coupling element 18 in such a way that the tilting movement of the two units follow one another. Connecting element 18 is connected to front yoke 12 by means of connecting rod 19 and by means of connecting rod 19' to rear yoke 12'. In this example, coupling element 18 comprises a triangular-shaped beam.

Steering sensor 4 is coupled to the steering shaft to the front wheel unit in such a way that it registers the steering force. The tilt angle sensor 5 is connected in such a way that it registers the angle between the tilting frame section 1 and the front yoke 12. In this example, reversing sensor 6 and speed sensor 7 are positioned in the right-hand front wheel. The lateral acceleration sensor 8 is positioned at the bottom of the tilting frame section 1. The signals from all the sensors are conducted via electric wires to measurement and control unit 9 in which signal processing and control of the hydraulic tilting cylinder 10 takes place. In this example, the pressure control of the hydraulic fluid, which leads to activation of hydraulic tilting cylinder 10, is integrated in measurement and control unit 9. The hydraulic tilting cylinder 10 connects yoke 12 and the tilting frame section 1 in such a way that activation of hydraulic tilting cylinder leads to a rotation of the yoke relative to the tilting frame section 1. This rotation results in a tilting of the tilting frame section 1 relative to the wheelbase. A turn of the handlebar to the right will result in a reaction similar to that portrayed in the description of FIG. 1. Owing to the fact that the two yokes 12 and 12' are coupled to one another by coupling element 18, a tilting moment such as exerted by the hydraulic tilting cylinder 10 on front yoke 12 will also be transmitted to yoke 12'. As a result of this, the two wheel units are coupled and exhibit practically the same tilting behaviour relative to tilting frame section 1.

Figure 4A:
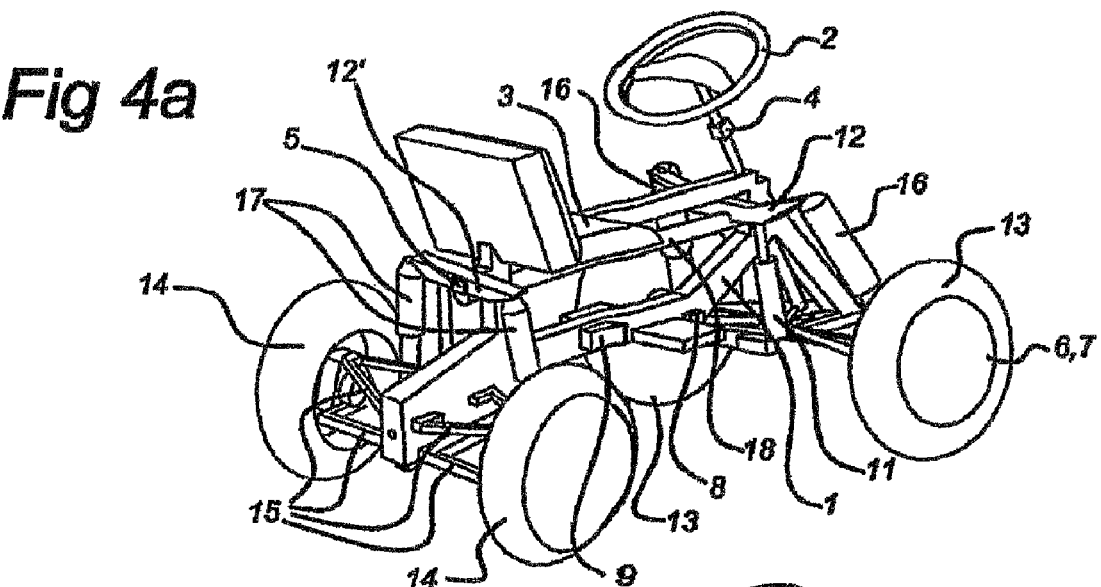
FIGS. 4a, 4b and 4c shows diagrammatically in a perspective side view another version of a four-wheel vehicle equipped with two steering front wheels and two rear wheels with the sensor elements in accordance with the invention.
Figure 4B:
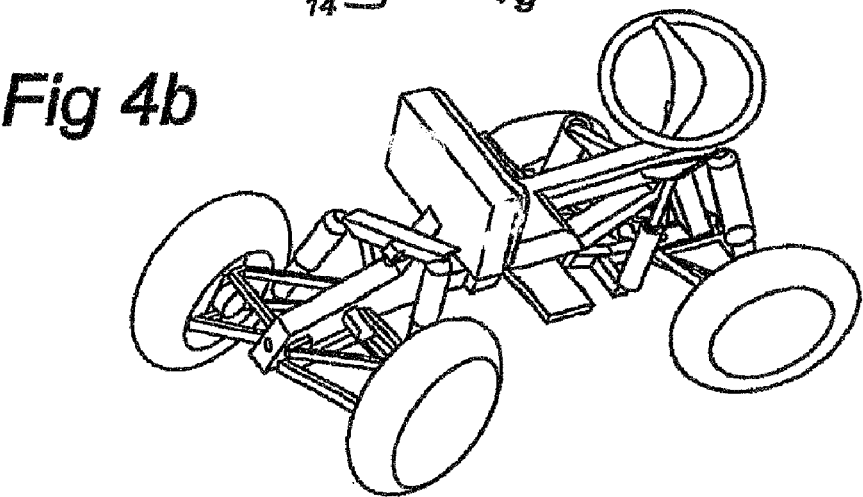
Figure 4C:
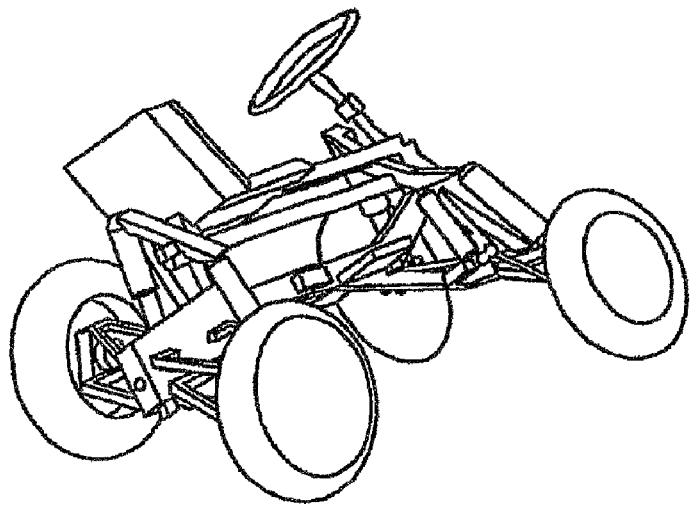
Figure 5:
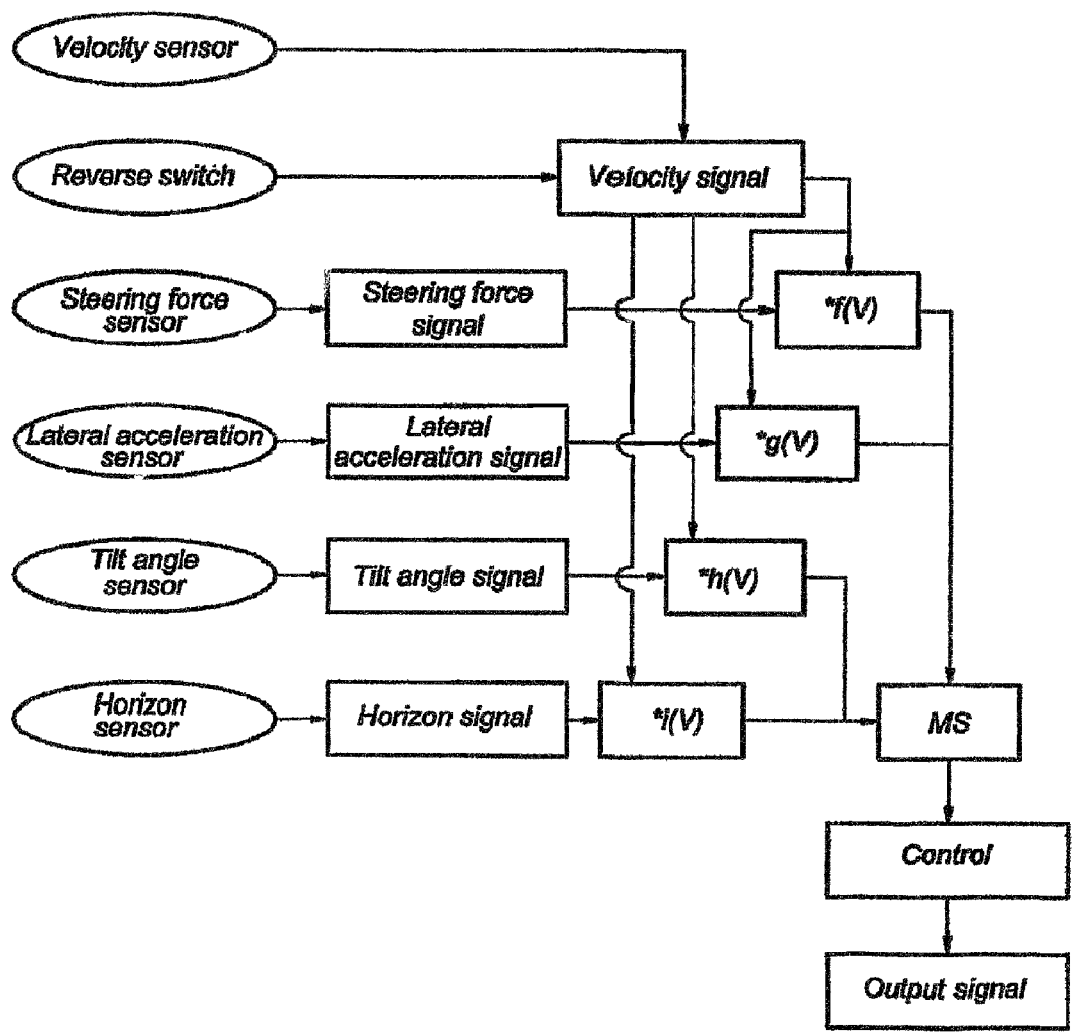
FIG. 5 shows diagrammatically an example of a simple measurement and control scheme in which is described how the various sensor signals contribute to the control.
Figure 6:
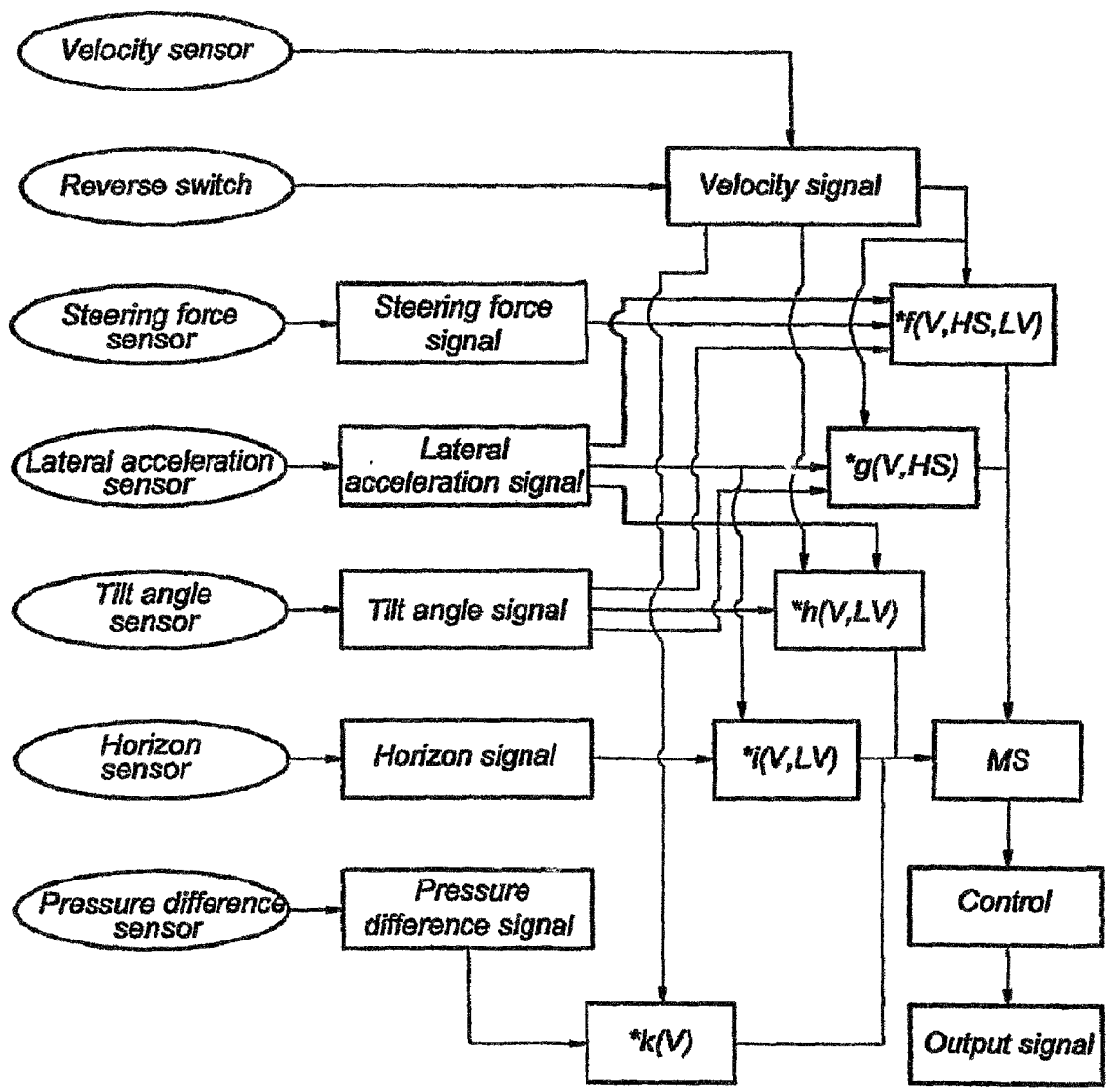
FIG. 6 shows diagrammatically an example of a more complex measurement and control scheme in which is described how the various sensor signals combined contribute to the control.

FIG. 4 also shows a four-wheel vehicle equipped with two steering front wheels and two rear wheels with a tilting frame section 1. The tilting frame section 1 has a steering wheel 2, in this case implemented as a round steering wheel, and a seat 3. The tilting frame section 1 is fixed to the front wheel unit, which consists of the front wheels 13, the MacPherson wheel suspension 16 in which the shock absorbers are integrated and the front yoke 12, so that it can rotate. The tilting frame section 1 is also fixed to the rear wheel unit, which consists of the rear wheels 14, the double wishbone 15, the shock absorbers 17 and the rear yoke 12', so that it can rotate. The front wheel unit and rear wheel unit are coupled by a coupling element 18 in such a way that the tilting movement of the two units follow one another. In contrast to FIG. 3, coupling element 18 is in a high position and linked directly to front yoke 12 and rear yoke 12'. As a result of this, no connecting rod is required. In addition, coupling element 18 is a round rod instead of a triangular beam.

Steering sensor 4 is coupled to the steering shaft to the front wheel unit in such a way that it registers the steering force. The tilt angle sensor 5 is connected in such a way that it registers the angle between the tilting frame section 1 and the front yoke 12. In this example, reversing sensor 6 and speed sensor 7 are positioned in the right-hand front wheel. The lateral acceleration sensor 8 is positioned at the bottom of the tilting frame section 1. The signals from all the sensors are conducted via electric wires to measurement and control unit 9 in which signal processing and control of the hydraulic tilting cylinder 10 takes place. In this example, the pressure control of the hydraulic fluid, which leads to activation of hydraulic tilting cylinder 10, is integrated in measurement and control unit 9. The hydraulic tilting cylinder 10 connects yoke 12 and the tilting frame section 1 in such a way that activation of hydraulic tilting cylinder leads to a rotation of the yoke relative to the tilting frame section 1. This rotation results in a tilting of the tilting frame section 1 relative to the wheelbase. A turn of the steering wheel to the right will result in a reaction similar to that portrayed in the description of FIG. 1. Owing to the fact that the two yokes 12 and 12' are coupled to one another by coupling element 18, a tilting moment such as exerted by the hydraulic tilting cylinder 10 on front yoke 12 will also be transmitted to yoke 12'. As a result of this, the two wheel units are coupled and exhibit practically the same tilting behaviour relative to tilting frame section 1.

In FIG. 1A, 20 indicates a force element, such as a cylinder or electromotor to provide a steering force or moment on the front wheel.

The invention claimed is:
1. A vehicle, comprising:
at least three wheels (13, 14), of which at least two wheels are situated on either side of a centre of gravity of a longitudinal axis of the vehicle, and at least one of the wheels (13) has a steering effect on a direction of the vehicle;
a frame comprising a tilting frame section (1) configured to rotate around the longitudinal axis relative to a road surface;
means for steering (2) mounted so that the means for steering can rotate relative to the tilting frame section (1);
one or more tilting elements (10) which are connected to the tilting frame section and the wheels for exerting at least one of a tilting moment or tilting movement between the tilting frame section (1) and the road surface;
a speed sensor (7) with which the speed of the vehicle relative to the road surface can be determined;
a steering sensor (4) with which a speed, a force, a torque or a size of a steering wheel movement for achieving a change in a direction of the at least one wheel (13) having the steering effect can be determined; and
a lateral acceleration sensor (8) coupled to the tilting frame section (1) so that the lateral acceleration sensor (8) follows a rotational position of the tilting frame section,
wherein signals of the speed sensor (7), the steering sensor (4) and the lateral acceleration sensor (8) being input into a control unit (9), in which the signals are combined to form a control signal to control at least one of the tilting elements (10), a steering force or moment on the at least one wheel (13) having the steering effect, and in the control unit (9) an individual contribution from a signal of the lateral acceleration sensor and the signal of the steering sensor to the control signal to control the tilting of the vehicle is determined by the speed signal so that at a forward speed below 5 km/h, the lateral acceleration sensor (8) contributes greater than 50% to the control signal.

2. The vehicle according to claim 1, wherein the vehicle is provided with a tilt angle sensor (5), which is positioned such that the tilt angle sensor (5) can determine an angle of rotation between the tilting frame section (1) and at least one of the road surface or an orientation unit providing a predetermined horizon orientation.

3. The vehicle according to claim 1, wherein the lateral acceleration sensor (8) is mounted within a radius of 30 cm around a rotational axis in a longitudinal direction of the tilting frame section (1).

4. The vehicle according to claim 1, wherein the vehicle is provided with at least two air pressure sensors which are positioned laterally on the vehicle.

5. The vehicle according to claim 1, wherein at least one of the speed sensor, the steering sensor, the lateral acceleration sensor, the tilt angle sensor or the air pressure sensors contain an electric or electronic sensor.

6. The vehicle according to claim 1, wherein the steering sensor (4) contains strain gauges.

7. The vehicle according to claim 1, wherein the lateral acceleration sensor (8) contains an electronic g sensor.

8. The vehicle according to claim 1, wherein the vehicle is provided with a reversing sensor (6) which can establish a direction of travel of the vehicle.

9. The vehicle according to claim 1, wherein the tilting elements (10) comprise hydraulic components.

10. The vehicle according to claim 9, wherein the vehicle is provided with a pressure sensor which can measure a hydraulic pressure of a fluid with which the tilting elements are driven.

11. The vehicle according to claim 1, wherein the vehicle is provided with a microelectronic circuit for control of the tilting elements.

12. The vehicle according to claim 1, wherein the vehicle has at least four wheels (13, 14), wherein two front wheels form a front wheel unit and two rear wheels form a rear wheel unit, and the front wheel unit and the rear wheel unit are connected by a coupling element (18) in such a way that one wheel unit can transmit the tilting moment to the other wheel unit.

13. The vehicle according to claim 12, wherein the coupling element comprises a torsion bar, a chain, a steel wire or a hydraulic line.

14. The vehicle according to claim 13, wherein transmission via the coupling element is such that the two wheel units exhibit a proportional but different tilt deflection compared with an upright situation.

15. A method for tilt control of the vehicle according to claim 1, comprising:

measuring at least one of the speed, the force, the torque or the size of the steering wheel movement and the lateral acceleration;

inputting at least one signal from the measuring into a control unit; and combining the signals in the control unit to form a control signal, wherein an individual contribution to the control signal is determined by the speed signal in which at the forward speed below 5 km/h the lateral acceleration sensor contributes for more than 50% to the control signal.

16. The method according to claim 15, wherein a signal from a tilt angle sensor is used as a control signal to control the tilting elements.

17. The method according to claim 15, wherein a signal from an air pressure sensor is also used as a control signal to control the tilting elements.

18. The method according to claim 15, wherein the lateral acceleration sensor registers longitudinal acceleration and a signal of the longitudinal acceleration is used to detect a fault in the speed sensor.

19. The method according to claim 15, wherein the measurement of tilt angle, lateral acceleration and steering force in combination with other vehicle information is used for signal analysis and fault detection and, in the event of detecting the fault, to activate at least one of giving a warning or a fault mode.

20. A vehicle, comprising:

at least three wheels, of which at least two wheels are situated on either side of a centre of gravity of a longitudinal axis of the vehicle, and at least one of the wheels has a steering effect on a direction of the vehicle;

a frame comprising a tilting frame section configured to rotate around the longitudinal axis relative to a road surface;

a handlebar mounted so that the handlebar can rotate relative to the tilting frame section;

one or more tilting elements which are connected to the tilting frame section and the wheels for exerting at least one of a tilting moment or tilting movement between the tilting frame section and the road surface;

a speed sensor with which the speed of the vehicle relative to the road surface can be determined;

a steering sensor with which a speed, a force, a torque or a size of a steering wheel movement for achieving a change in a direction of the at least one wheel having the steering effect can be determined; and a lateral acceleration sensor coupled to the tilting frame section so that the lateral acceleration sensor follows a rotational position of the tilting frame section, wherein signals of the speed sensor, the steering sensor and the lateral acceleration sensor being input into a control unit, in which the signals are combined to form a control signal to control at least one of the tilting elements, a steering force or moment on the at least one wheel having the steering effect, and in the control unit an individual contribution from a signal of the lateral acceleration sensor and the signal of the steering sensor to the control signal to control the tilting of the vehicle is determined by the speed signal so that at a forward speed below 5 km/h, the lateral acceleration sensor contributes greater than 50% to the control signal.

* * * * *